United States Patent [19]
Furuhashi

[11] Patent Number: 6,044,839
[45] Date of Patent: Apr. 4, 2000

[54] LIQUID HEATING APPARATUS

[75] Inventor: Toshio Furuhashi, Shizuoka-ken, Japan

[73] Assignee: Eiken Industries Co. Ltd., Japan

[21] Appl. No.: 09/218,270

[22] Filed: Dec. 21, 1998

[51] Int. Cl.[7] .................................................. A47J 27/00
[52] U.S. Cl. ............................. 126/391; 99/403; 99/408
[58] Field of Search .............................. 126/391; 99/403, 99/408

[56] References Cited

U.S. PATENT DOCUMENTS

| | | |
|---|---|---|
| 2,569,112 | 9/1951 | Miller et al. . |
| 3,217,633 | 11/1965 | Anetsberger ............................... 99/408 |
| 4,397,299 | 8/1983 | Taylor ....................................... 99/403 |
| 4,602,612 | 7/1986 | Schwizer .................................. 99/403 |
| 4,848,318 | 7/1989 | Brewer ..................................... 99/403 |
| 4,858,592 | 8/1989 | Hayek et al. . |

FOREIGN PATENT DOCUMENTS

| | | |
|---|---|---|
| 0 125 750 | 11/1984 | European Pat. Off. . |
| 1405410 | 5/1965 | France . |
| 2504001 | 10/1982 | France . |
| 61-45046 | of 0000 | Japan . |
| 61-64837 | of 0000 | Japan . |
| 56-37496 | 9/1981 | Japan . |

*Primary Examiner*—Carroll Dority
*Attorney, Agent, or Firm*—Harness, Dickey & Pierce, P.L.C.

[57] ABSTRACT

A novel liquid heating apparatus is provided by which sufficient heat efficiency is achieved with the production cost reduced by simplification of the construction thereof, and the maintenance of which is easily carried out. The liquid heating apparatus is provided with a burner unit disposed downward of the bottom portion of a liquid tank formed to be a rectangular parallelpiped in its plan view for raising the temperature of the liquid in the liquid tank by heating the bottom portion of the liquid tank using a burner of the burner unit. A heating plane opposite flame ports of the burner and a low temperature portion located downward of the heating plane are formed at the bottom portion of the liquid tank. Fins protruding toward the burner direction are juxtaposed and fixed on the rear side of the heating plane in the lengthwise direction thereof. A fan capable of generating a flow of combustion gas among the fins is provided in the burner unit. In the burner unit, a plurality of rows of flame ports located along the lengthwise direction of fins are provided at one side in the lengthwise direction of the burner unit. A burner in which a fan is provided is also disposed therein. Furthermore, an exhaust portion is disposed at the other side therein.

7 Claims, 9 Drawing Sheets

LIQUID HEATING APPARATUS

FIELD OF THE INVENTION

The present invention relates to a liquid heating apparatus of, for example, a food frying machine, a fryer, noodle boiling equipment, etc., and in particular a liquid heating apparatus which is able to efficiently heat liquid in a liquid tank.

BACKGROUND AND SUMMARY OF THE INVENTION

Conventionally, a food frying machine acting as a liquid heating apparatus for frying foods with edible oil stored in an oil reservoir is disclosed by, for example, Japanese Laid-open Utility Model No. 64837 of 1986. The food frying machine 51 of this type is, as shown in FIG. 11, such that a reservoir portion 54 which accumulates sediment remaining in an oil tank 52 is formed so as to protrude downward from one end side of the bottom 53 of the oil tank 52, a concave heat leading passage 56 which leads heat from a burner 55 is formed so as protrude from the rear side of the bottom 53 of the oil tank 52, and a fin 57 having a cross-shaped section is fixed in the heat leading passage 56.

However, in a food frying machine 51, since a burner 55 is disposed at the upstream side in its lengthwise direction $X_7$ of a heat leading passage 56 provided at the bottom portion 53 of an oil tank 52, combustion gas resulting from flames of the burner 55 is caused to flow through the heat leading passage 56, wherein although at this time heat efficiency is increased to some degree by the fins 57, the flame of the burner 55 is not positioned downward along the lengthwise direction of the fins 57. Therefore, it is difficult to sufficiently raise the temperature of the fins 57 themselves.

Furthermore, since the heat leading passage 56 formed at the bottom portion 53 of the oil tank 52 is provided so as to have an appointed interval in the direction orthogonal to its lengthwise direction, and the outer circumferential end of the fins 57 is not in contact with the inner surface of the heat leading passage 56 and has an appointed interval, the heat transmitting area enabled by the fins 57 can not be increased. Resultantly, there was such a problem in which sufficient heat efficiency could not be obtained.

Furthermore, since the fins 57 themselves are complicated and are cross-shaped in their sections, the production cost thereof is increased, and since it is necessary to form a concave heat leading passage 56 at the bottom portion 53 of the oil tank 52, the production cost of the oil tank 52 is also increased, and therefore causes a problem in that the structure of the food frying machine 51 itself is complicated and the production cost thereof is accordingly increased.

Furthermore, since the fin 57 having a cross-shaped section is disposed in the heat leading passage 56 in a fixed state, it becomes difficult to eliminate soots or the like which is adhered to the deep side (upward side) of the heat leading passage 56 of the fin 57, wherein cleaning work of the burner portion 55 is made cumbersome, and since the bottom portion 53 of the oil tank 52 is made roughly horizontal, the sediment is deposited on the bottom portion 53, and becomes cumbersome to remove the sediment. That is, there is a problem in that the maintenance of a food frying machine 51 itself is not easily carried out.

The present invention was developed in view of the abovementioned shortcomings and problems, and it is therefore an object of the invention to provide a liquid heating apparatus which is cheap in its production cost with a simplified structure, by which easy maintenance can be carried out and sufficient heat efficiency can be secured.

In order to achieve the abovementioned objects, the invention is featured in that, in a liquid heating apparatus, in which a burner unit is disposed downward of the bottom portion of a liquid tank formed to be a rectangular parallelpiped in its plan view, for raising the temperature of liquid in the liquid tank by heating the bottom portion of the liquid tank using a burner of the burner unit, a heating plane opposite flame ports of the burner and a low temperature portion located downward of the heating plane are formed at the bottom portion of the liquid tank, fins protruding toward the burner direction are juxtaposed and fixed on the rear side of the heating plane in the lengthwise direction thereof, and a fan capable of generating a flow of combustion gas among the fins is provided in the burner unit.

With such a construction, the temperature of liquid accumulated by an appointed amount in a liquid tank is raised by heating the heating plane at the bottom of the liquid tank by combustion of a burner of a burner unit and reaches an appointed temperature level. At this time, the combustion gas generated due to combustion of the burner is caused to forcibly flow through fins secured and fixed on the heating plane in the lengthwise direction of the heating plane by blowing of a fan installed in the burner unit. With a flow of the combustion gas as in the fins, the heat transmitting area is expanded to increase heat efficiency, and the fins may be only provided so as to protrude from the heating plane into the burner direction, and the profile thereof is simplified to cause the maintenance thereof to be made easy.

Furthermore, in accordance with another feature of the invention, the burner unit is provided, at one side in the lengthwise direction thereof, with a plurality of rows of flame ports disposed along the lengthwise direction of the fins and a burner having a fan, and is provided with an exhaust portion at the other side in the lengthwise direction thereof. With such a construction, a plurality of rows of flame ports of a burner secured at one side in the lengthwise direction of the burner unit are disposed opposite to and downward of the fins installed on the rear side of the heating plane of the liquid tank, wherein flames coming out from the flame ports heats the heating plane (fins). Accordingly, the combustion gas which has heated the heating plane is caused to flow through the fins, and is exhausted outside from the exhaust portion secured at the other side of the burner unit. Thereby, the combustion gas is caused to efficiently flow through the fins secured on the rear side of the heating plane of the liquid tank, wherein heat efficiency can be further increased.

Furthermore, according to the invention, the burner unit can be provided with a control member, which controls a flow of secondary air, at a point position between the respective flames upward of a plurality of rows of flame ports of the burner. With such a construction, since secondary air regulated by a controlling member is supplied between flames (interior flames) discharged upward from a plurality of rows of flame ports of the burner, the exterior flames are expanded by the secondary air, wherein a stabilized combustion state of the burner can be achieved to cause heat efficiency to be further increased.

In addition, the heating plane of the liquid tank can be formed to be inclined. With such a construction, since sediment, which is apt to be accumulated on the heating plane in the liquid tank, automatically drops and is stored in the low temperature portion by the inclination plane, it becomes simple to eliminate the sediment from the liquid tank, and maintenance can be carried out easier still.

As described above, since fins are fixed on the rear side of the heating plane of a liquid tank and protrude therefrom along the lengthwise direction thereof and a fan for supplying secondary air is provided in the burner unit, combustion gas produced by combustion of the burner of the burner unit is forcibly caused to flow in the lengthwise direction of the heating plane along the fins, whereby sufficient heat efficiency can be obtained.

Still further, since the fins are formed to be channel-like in their cross section and are fixed directly at the rear side of the heating plane of a liquid tank, the construction of the fins and liquid tank can be simplified to cause the production cost of a liquid heating apparatus itself to be decreased. In addition, since the fins are made open in the protruding direction, the cleaning thereof can be simplified, and since sediment which is generated, for example, in a frying operation, can be deposited in a low temperature portion of the liquid tank, it can be easily removed, and it is possible to easily carry out maintenance of a liquid heating apparatus.

DETAILED DESCRIPTION OF THE PREFERRED EMBODIMENTS

Figure 1:
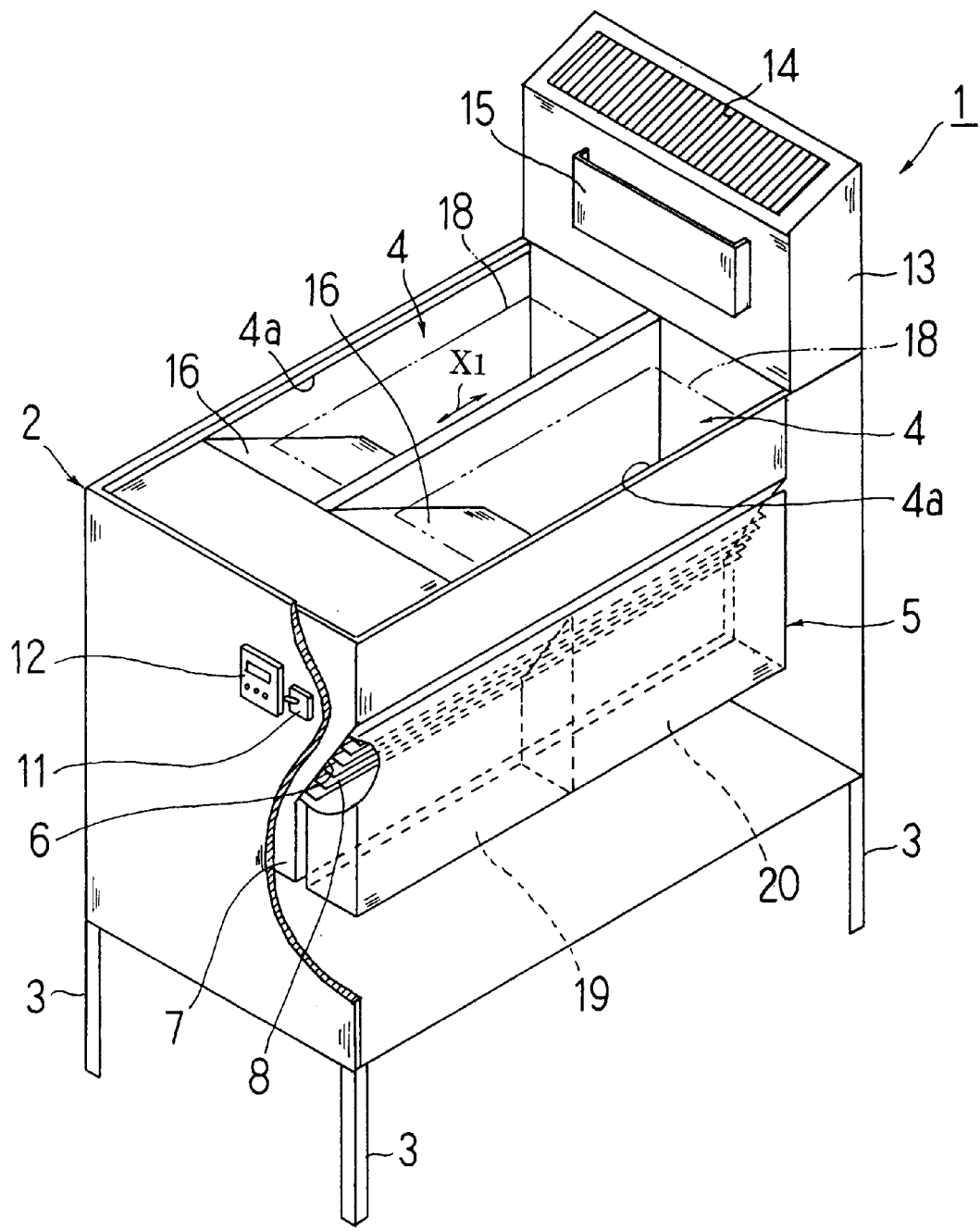
FIG. 1 is a perspective view showing a preferred embodiment of a liquid heating apparatus according to the invention, with a part thereof detached.
Figure 2:
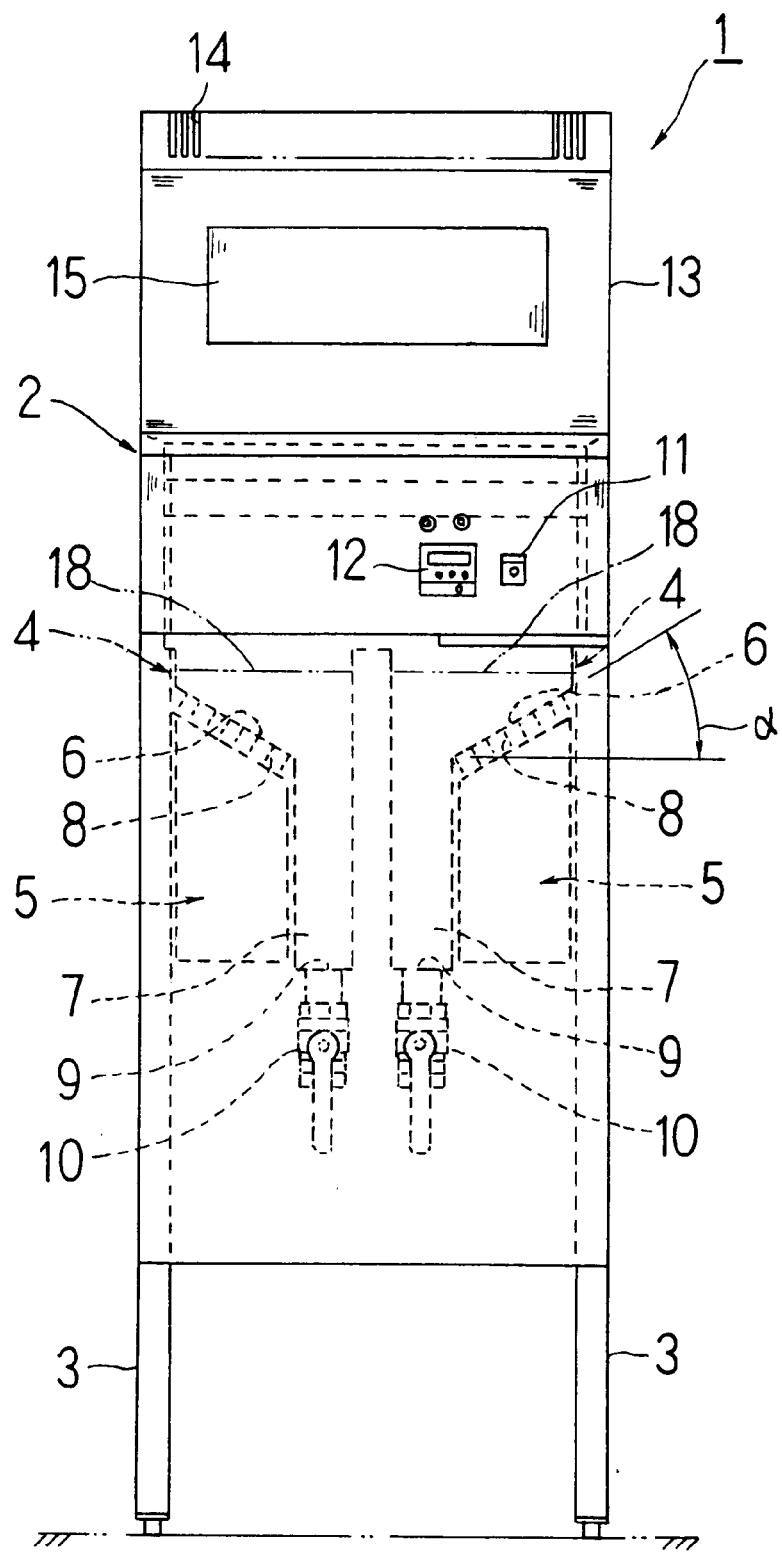
FIG. 2 is a front elevational view thereof.

Hereinafter, a detailed description is given of a preferred embodiment of the invention with reference to the accompanying drawings and claims, wherein FIGS. 1 through 9 show a preferred embodiment of a liquid heating apparatus according to the invention.

In FIG. 1 through FIG. 4, a liquid heating apparatus 1 has a casing 2 of roughly rectangular parallelpiped, which is provided with four legs 3 at the lower part thereof. A pair of liquid tanks 4 are provided in the casing 2, and a burner unit 5 is disposed at the lower part of the liquid tanks 4, respectively. The liquid tanks 4 are formed to be roughly rectangular parallelpiped having an opening 4a on the upper surface thereof, and an inclination plane 6 forming the heating plane and a low temperature portion 7 secured so as to protrude downward of the inclination plane 6 are formed at the bottom portion thereof.

Figure 3:
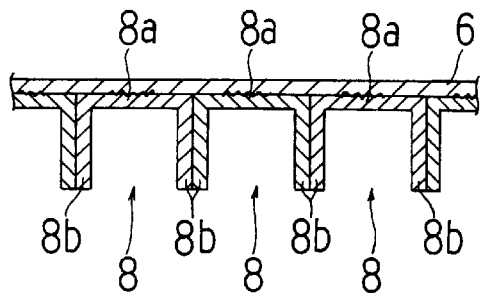
FIG. 3 is a cross-sectional view of fins attached thereto.
Figure 4:
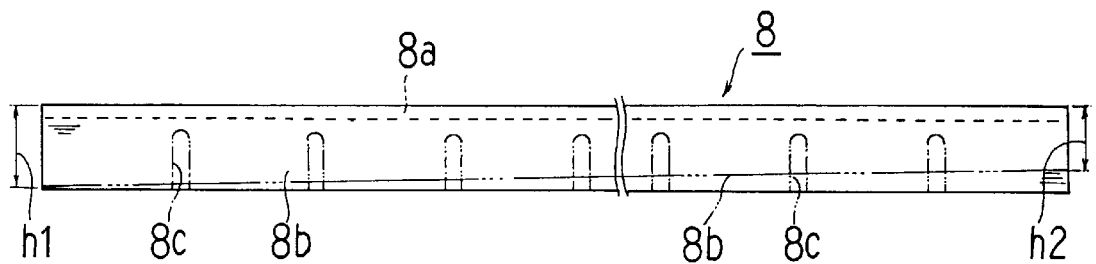
FIG. 4 is a side elevational view thereof.

The inclination plane 6 is inclined at an appointed degree of angle (for example, in FIG. 2, α=15 deg. through 40 deg., preferably α=approx. 30 deg.) from the outside toward the inside along the lengthwise direction $X_1$, and fins 8 are secured at the rear side of the inclination plane 6 so as to protrude therefrom. The fins 8 are formed to be like a channelled member in its section, which has a bottom wall portion 8a and a pair of side wall portions 8b, as shown in FIG. 3 and FIG. 4. The bottom wall portion 8a is secured and fixed at and integral with the rear side of the inclination plane 6 by seam welding or the like over the entire length from one end side to the other end side along the lengthwise direction (the same direction as the lengthwise direction $X_1$ of the liquid tank 4) of the inclination plane 6.

Furthermore, the low temperature portion 7 is provided downward of the lower edge of the inclination plane 6, that is, downward of one end side in the direction orthogonal to the lengthwise direction $X_1$ of the liquid tank 4, wherein a liquid drain portion 9 (See FIG. 2) to which a liquid drain valve 10 is attached is formed at the front edge side in the lengthwise direction of the bottom plane of the low temperature portion 7. And the pair of liquid tanks 4 are attached to the casing 2 in such a state where the low temperature portions 7 are close to each other (that is, in a state where the inclination planes 6 are, respectively, inclined inwardly downward).

A power circuit breaker 11, a temperature regulator 12, etc., which control operations of the burner unit 5 described later are provided at the front side of the casing 2, and an exhaust duct 13 is disposed at the rear side of the casing 2. The exhaust duct 13 is disposed so that the tip end thereof protrudes upward of the upper surface of the liquid tank 4, and a number of exhaust ports 14 are formed on the upper surface. Furthermore, a fry basket retainer 15 is fixed at the front side of the exhaust duct 13.

Furthermore, a guide plate 16 (See FIG. 1) which is inclined downward toward the other side (rearward of the casing 2) and guides and supplies, for example, foods to be fried, into liquid 18 such as water or edible oil in the liquid tank 4, is detachably provided at one side of the opening 4a portion (frontward of the casing 2) of the liquid tank 4. Furthermore, the liquid tank 4, exhaust duct 13, etc., are formed of, for example, stainless steel plates.

The burner unit 5 disposed at the lower part of the liquid tank 4 is formed so that the entire profile is like a slender rectangular parallelpiped as shown in FIG. 5 through FIG. 8, and the burner 19 having an opening 19a on the upper surface thereof is disposed roughly half one side in the same direction as the lengthwise direction $X_1$ of the liquid tank 4, and an exhaust portion 20 having an opening 20a on the upper surface thereof is disposed roughly half at the other side thereof. The burner 19 is a Bunsen type burner and is provided with a mixture tube 21 whose tip end side is bifurcated into two directions, and burner heads 22 in which a number of flame ports 22a, which are connected to the tip end of the mixture tube 21, are juxtaposed in a plurality of rows (four rows in the drawings).

A nozzle 24 of a nozzle holder 23 and a primary air inlet portion 25 are provided at the base end side of the mixture tube 21, and the mixture tube 21 is bifurcated into two directions from the base end side, and the tip end thereof is connected to both end portions in the lengthwise direction of the burner head 22. Furthermore, the nozzle holder 23 is connected to a pressure regulator 27 secured at the vertical portion 26a of an L-shaped burner rear plate 26 of the burner 19, wherein a pair of gas valves 28 and 29 are connected to the pressure regulator 27.

A pipe 30 to regulate the stream of the secondary air is disposed between the respective row-like flame ports 22a and outside the flame ports 22a at both sides in such a state where it becomes parallel to the row-like flame ports 22a. Furthermore, an ignition electrode 31 is provided at the upper part of one end side of the flame port 22a at one side among the row-like flame ports 22a while a flame detector 32 is provided at the upper part at one side of the flame port 22a at the other side.

A fan 35 is disposed outside a burner bottom plate 34 opposite the burner head 22 of the burner 19. The fan 35 is provided with a fan motor 37 to which lead wires 36 are connected, and a rotation fan (not illustrated), and is fixed at the opening 34a portion secured at the burner bottom plate 34 by a fan fixing plate 38. A pressure uniforming plate 40 having a number of pores drilled is provided between the opening 34a, which will become a discharge port of the fan 35, and a porous plate 39 secured at the lower part of the base end side of the mixture tube 21, and the pressure uniforming plate 40 regulates the secondary air supplied by the fan 35.

On the other hand, the exhaust portion 20 provided at the other side in the lengthwise direction $X_1$ of the burner unit 5 has an exhaust plate 41 fixed at the horizontal part 26b of the abovementioned burner rear plate 26 in an inclined state, and the inclination angle β (See FIG. 8) of the exhaust plate 41 is set to be roughly equal to the inclination angle a of the inclination plane 6 of the abovementioned liquid tank 4. Furthermore, a duct connection portion 42 which is able to connect the exhaust portion 20 to the abovementioned exhaust duct 13 is provided at the rear end portion of the burner rear plate 26.

Accordingly, the burner unit 5 thus constructed is disposed at the lower part of the inclination plane 6 of the abovementioned liquid tank 4 outside of the low temperature portion 7. At this time, the burner unit 5 is attached in such a state where the fins 8 fixed on the rear side of the inclination plane 6 of the liquid tank 4 are positioned on the upper portion of the exhaust plate 41 in the opening 19a of the burner 19 and in the opening 20a of the exhaust portion 20, and the lower end of the exhaust duct 13 is connected to the duct connection portion 42 of the exhaust portion 20. Thereby, heat (combustion gas) generated by combustion of the burner 19 is caused to continuously flow through the fins 8 secured on the rear side of the inclination plane 6 of the liquid tank 4 along the lengthwise direction $X_1$ of the burner unit 5 and is exhausted outside the liquid heating apparatus 1 through the exhaust duct 13.

Figure 9:
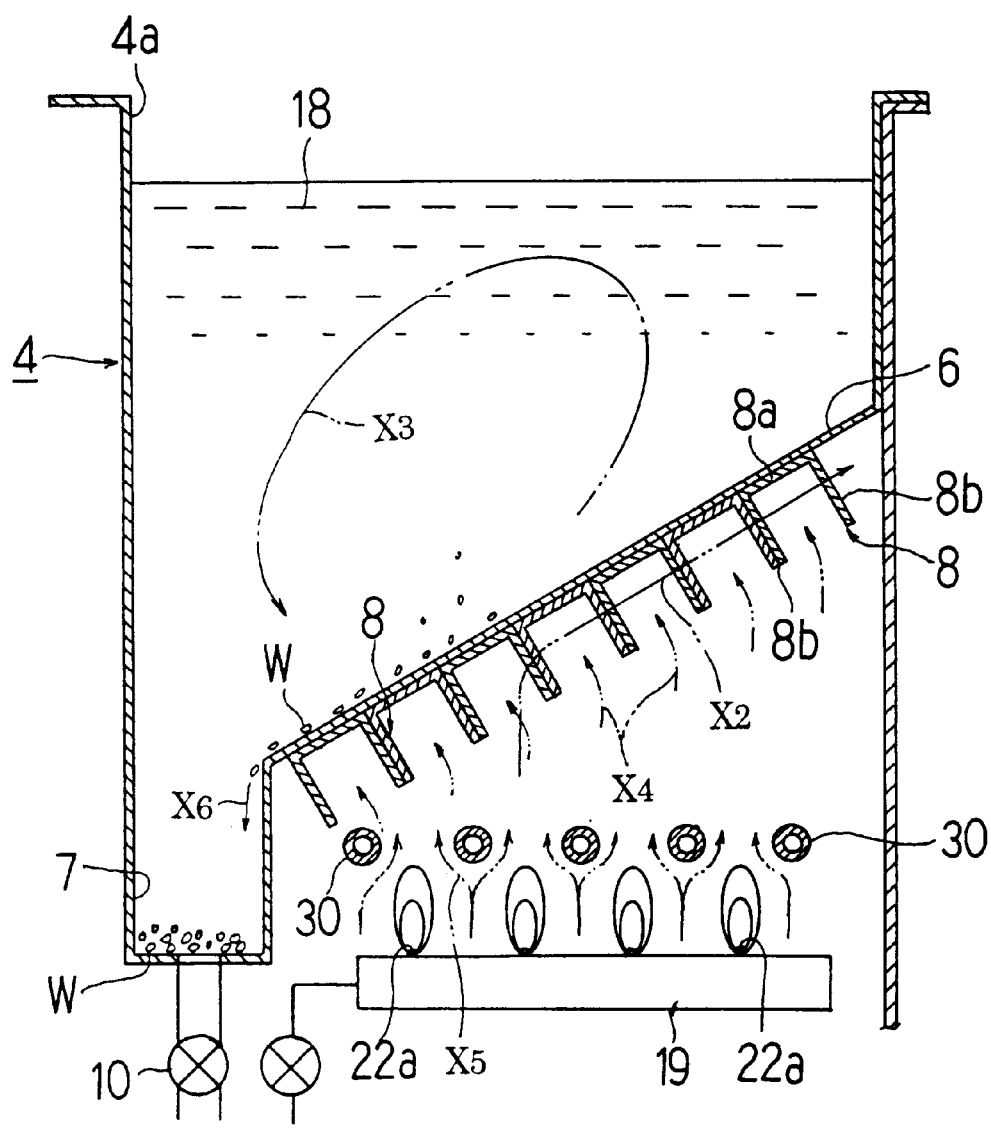
FIG. 9 is a view explaining the principle for description of the actions of the same liquid heating apparatus.
Figure 11:
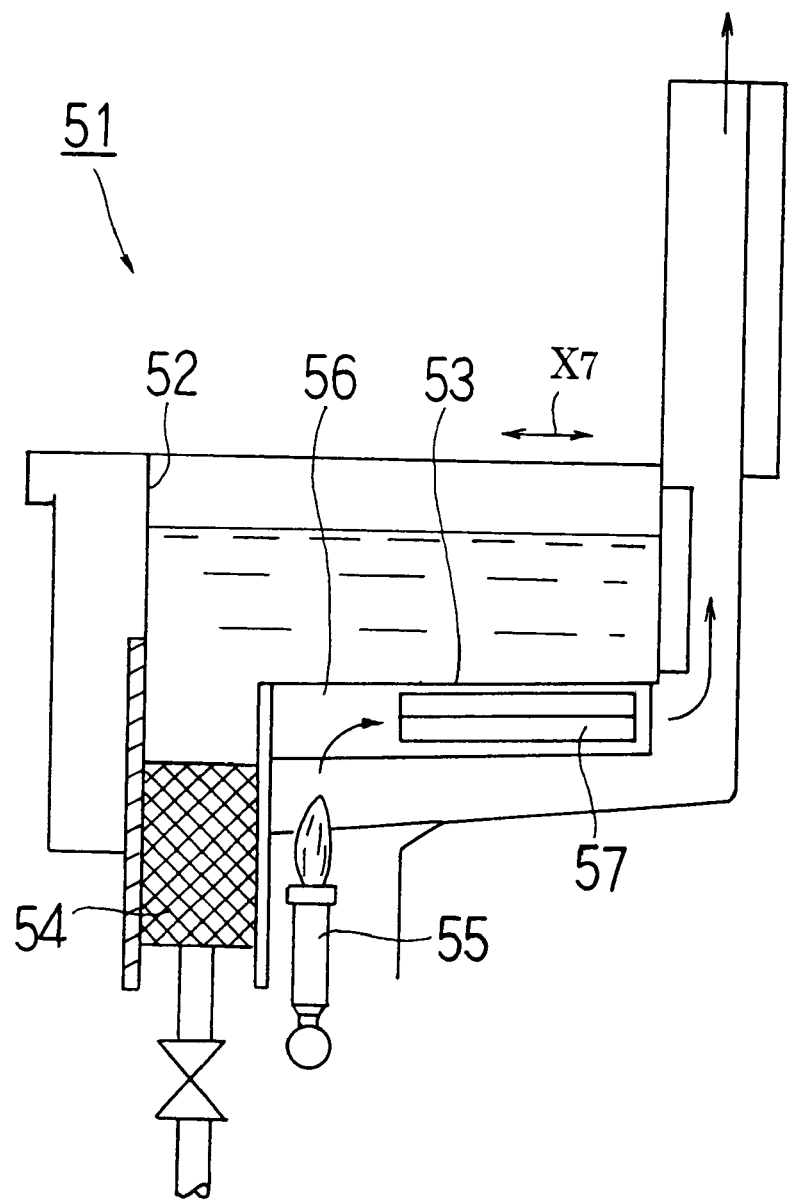
FIG. 11 is a brief side elevational view of a conventional liquid heating apparatus.

Next, a description is given of the actions of the abovementioned liquid heating apparatus on the basis of FIG. 9. Furthermore, FIG. 9 shows the principle of the abovementioned liquid heating apparatus 1, wherein the components which are the same as those in FIG. 1 through FIG. 8 are given the same reference numbers. First, the power circuit breaker 11 is turned on, and the temperature is set by the temperature setter 12. Then, as gas and primary air are supplied into the mixture tube 21 from the nozzle 24 and the primary air inlet port 25, they are mixed in the mixture tube 21 to generate mixed gas.

The mixed gas flows from the downstream side of the mixture tube 21 into the burner head 22 and is discharged upward from the respective flame portions 22a of the burner head 22. And, the mixed gas is ignited by a spark generated by an electric discharge of the ignition electrode 31. The burner 19 begins burning. Furthermore, secondary air is supplied from the pressure uniforming plate 40 and the pores of the porous plate 39 into the burner 19 by, for example, the fan 35 operating at the same time as gas is supplied. The stream of the secondary air is biased as shown by the arrow $X_5$ in FIG. 9 by the pipe 30 secured at the upper art of the flame 22a. The biased secondary air spreads the exterior flame to cause the burner 19 to burn.

Roughly half the portion in the lengthwise direction of the inclination plane 6 of the liquid tank 4 positioned upward of the burner 19 is heated by combustion of the burner 19. At this time, in a case where no fin 8 is provided on the inclination plane 6, since the combustion gas of the burner 19 is caused to quickly flow in the upward direction below the rear side of the inclination plane 6 in the direction orthogonal to the lengthwise direction of the inclination plane 6 as shown by the arrow $X_2$ in FIG. 9, the combustion gas can not be applied to the entire surface of the inclination plane 6 in an appointed period of time, and heating efficiency is worsened.

However, by fins 8 being provided on the inclination plane 6, most of the combustion gas flowing in the arrow direction $X_2$ is caused to flow in the fins 8 as shown by the arrow $X_4$, that is, to flow along the lengthwise direction of the inclination plane 6. Accordingly, the combustion gas flows from the upper part of the burner 19 to the upper part of the exhaust portion 20 along the lengthwise direction of the fins 8 to ensure that the combustion gas is roughly uniformly applied to the entire surface of the inclination plane 6. At this time, the heat transmitting area can be increased by the fins 8 having a channel-like section.

Furthermore, combustion gas is apt to be accumulated in the fins 8 in a case where the fins 8 are provided in parallel to the lengthwise direction of the inclination plane 6. However, since the fan 35 for supplying secondary air is provided at the burner 19 in the abovementioned liquid heating apparatus 1, the combustion gas is forcibly made to flow in the fins 8. Furthermore, since four rows of flame ports 22a of the burner head 22 are juxtaposed to each other along the juxtaposing direction (the direction orthogonal to the lengthwise direction in the inclination direction of the inclination plane 6) of the fins 8, row-like flame ports 22a are positioned downward of a roughly half portion in the lengthwise direction of the respective fins 8, wherein the respective flames directly operate on the respective fins 8 to cause the temperature thereof to be raised.

Combustion gas flown through the fins 8 while heating the inclination plane 6 at the upper part of the burner 19 of the liquid tank 4 flows through the fins 8 which are continuously provided at the upper part of the exhaust portion 20 at the downstream side, and further flows upward from the exhaust duct 13 connected to the duct connection portion 42 of the exhaust portion 20, wherein the combustion gas is exhausted outside through the exhaust port 14. Exhaust from the exhaust portion 20 to the exhaust duct 13 is forcibly carried out by the blowing of the fan 35 as described above, and the combustion gas is exhausted in a uniform state in the width direction of the exhaust duct 13.

As the inclination plane 6 is thus heated by combustion of the burner 19, liquid 18 stored in the liquid tank 4 is heated, convection of the liquid 18 is generated in the liquid tank 4 as shown by the arrow $X_3$, wherein the temperature of the liquid 18 is raised. The temperature of the liquid 18 is detected by a temperature sensor (not illustrated), and at the point of time when the temperature reaches the temperature established by the abovementioned temperature setter 12, the combustion of the burner 19 is caused to stop. Furthermore, when the temperature is made lower than an appointed temperature level, the burner 19 is turned on again. That is, the temperature of the liquid 18 in the liquid tank 4 can be maintained at an appointed temperature level by repetition of turning on and off the burner 19. If, for example, food is fried with liquid 18 such as edible oil, the temperature of which is set to an appointed temperature level, sediment W is generated. Since the sediment W drops from the inclination plane 6 into the low temperature portion 7 as shown by the arrow X$_6$ and is accumulated therein, no sediment W is accumulated on the inclination plane 6 which greatly influences heating of liquid 18, wherein it is possible to prevent heating efficiency from being lowered. Furthermore, since the low temperature portion 7 is disposed at the side portion of the burner 19, it is scarcely influenced by flames (heat), and the temperature of the low temperature portion 7 becomes remarkably lower than that of the upper part of the liquid tank 4. Therefore, almost no convection is generated. Accordingly, the sediment W on the bottom of the low temperature portion 7 is not agitated by convection of liquid 18, and is deposited as it is, wherein the upper level liquid 18 can be prevented from becoming dirty when carrying out a frying operation of foods.

In the liquid heating apparatus 1 according to the abovementioned preferred embodiment, since fins 8 are fixed and protrude along the lengthwise direction on the rear side of the inclination plane 6 at the bottom portion of the liquid tank 4, combustion gas generated by combustion of the burner 19 is caused to flow through the fins 8, and since a number of flame portions 22a of the burner 19 are juxtaposed in four lines like rows downward of a roughly half portion in the lengthwise direction of fins 8, the temperature of the fins 8 themselves, that is, the temperature of the combustion gas flowing through the fins 8 can be raised, wherein heat efficiency can be remarkably increased.

In particular, the fins 8 are made channel-like in their sections, the bottom wall portions 8a are adhered to and fixed on the rear side of the inclination plane 6 of the liquid tank 4 by seam welding, and the side wall portions 8b of the adjacent fins 8 are adhered closely to each other. Therefore, it is possible to greatly form a heat transmitting area by the fins 8, and heat efficiency can be further improved. Resultantly, it is possible to raise the temperature of liquid 18 in the liquid tank 4 to an appointed temperature level in a remarkably short time. For example, if the abovementioned liquid heating apparatus 1 is used as a frying machine of foods, a very efficient frying operation can be carried out.

Furthermore, since the fins 8 are channel-like in their cross section and the bottom wall portions 8a thereof are fixed at the rear side of the straight inclination plane 6 of the liquid tank 4, the profile of the fins 8 themselves can be simplified. Therefore, it is not necessary to carry out additional convex machining on the inclination plane 6 as in the prior arts, and the construction of fins 8 and liquid tank 4 can be simplified to cause the production cost of the liquid heating apparatus 1 to be decreased. Furthermore, the fins 8 can be easily attached to the inclination plane 6 by seam welding or the like.

Furthermore, since the inclination plane 6 and low temperature portion 7 are formed at the bottom portion of the liquid tank 4, sediment W produced in the liquid tank 4 is automatically caused to drop in the low temperature portion 7 via the inclination plane 6 and is deposited therein. Therefore, for example, since the sediment W can be eliminated through the opening 4a of the liquid tank 4 or eliminated by opening the liquid discharge valve 10, the liquid tank 4 can be easily cleaned up. Still furthermore, the sediment W is deposited in the low temperature portion 7 as it is, the sediment W is not subjected to any convection in the liquid tank 4, wherein the liquid 18 can be prevented from becoming dirty.

Furthermore, since the fins 8 are open between their side wall portions 8b, soot or the like which is adhered to the fins 8 can be easily removed by using a brush, etc., and this makes it possible to easily clean up the burner unit 5 portion. In particular, since a burner unit 5 in which a burner 19 and an exhaust portion 20 are made integral with each other is attached to the lower part of the inclination plane 6 of the liquid tank 4, the fins 8 can be exposed to the outside by only removing the burner unit 5, and the cleaning thereof can be made easier still. Judging from the abovementioned, the maintenance of the liquid heating apparatus 1 can be easily carried out.

Furthermore, although, in the abovementioned preferred embodiment, a description was given of a case where the liquid tank 4 is provided with an inclination plane 6 and a low temperature portion 7, the invention is not limited to the abovementioned case. For example, the inclination plane 6 may be made roughly flat as in the prior arts. Even though the plane 6 is so formed, flame ports 22a are positioned like rows downward of the fins 8 along the lengthwise direction thereof. Therefore, heat efficiency can be sufficiently increased in comparison with the prior examples. Still furthermore, in the abovementioned embodiment, a description was given of a case where two liquid tanks 4 are provided in a liquid heating apparatus 1, the invention may be applicable to any case where the number of the liquid tank 4 is one, two, three or more.

Figure 10:
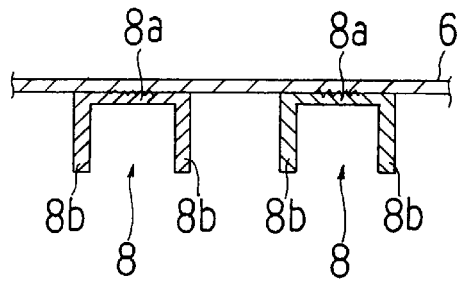
FIG. 10 is a cross-sectional view showing another attaching construction of fins.
Figure 5:
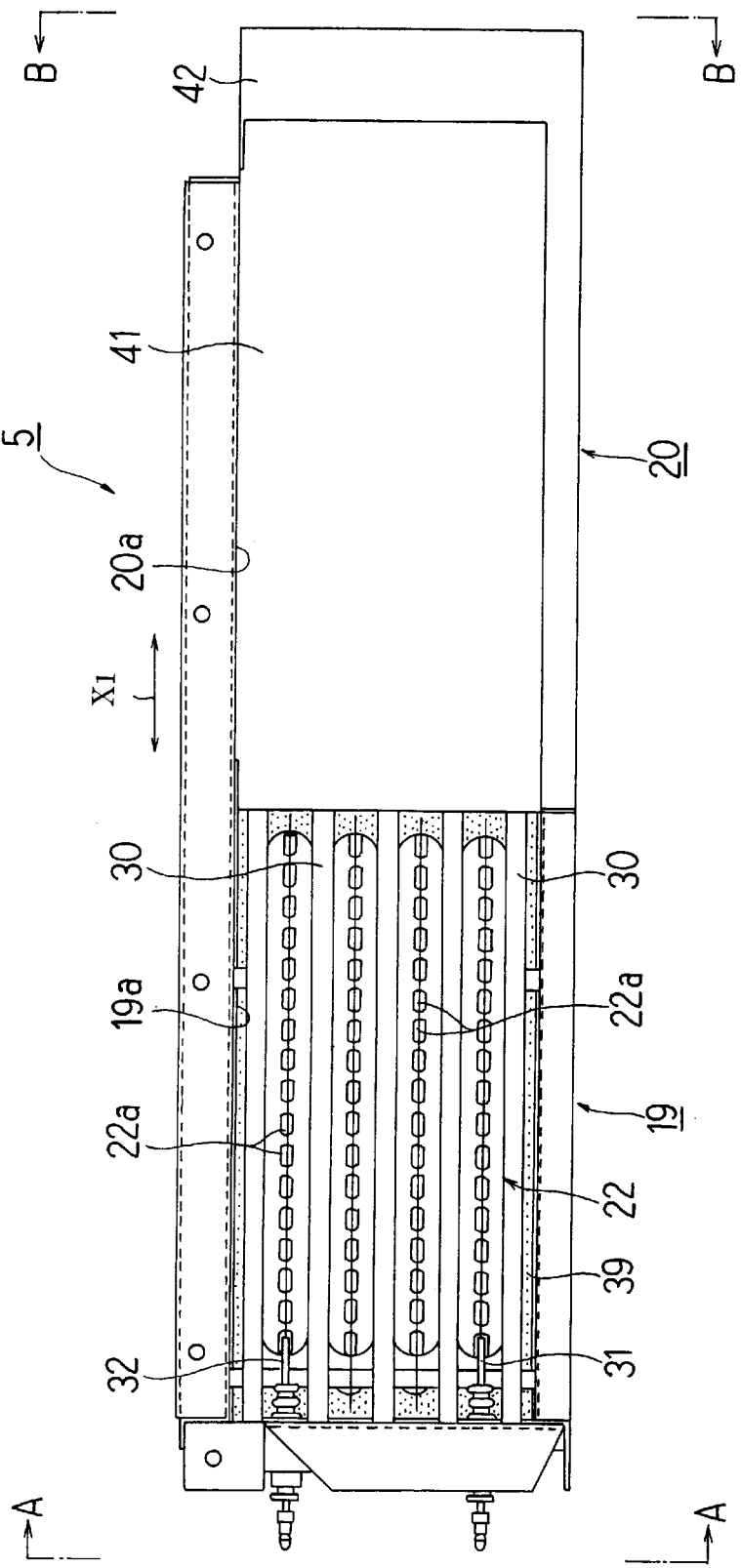
FIG. 5 is a plan view of a burner unit incorporated therein.
Figure 6:
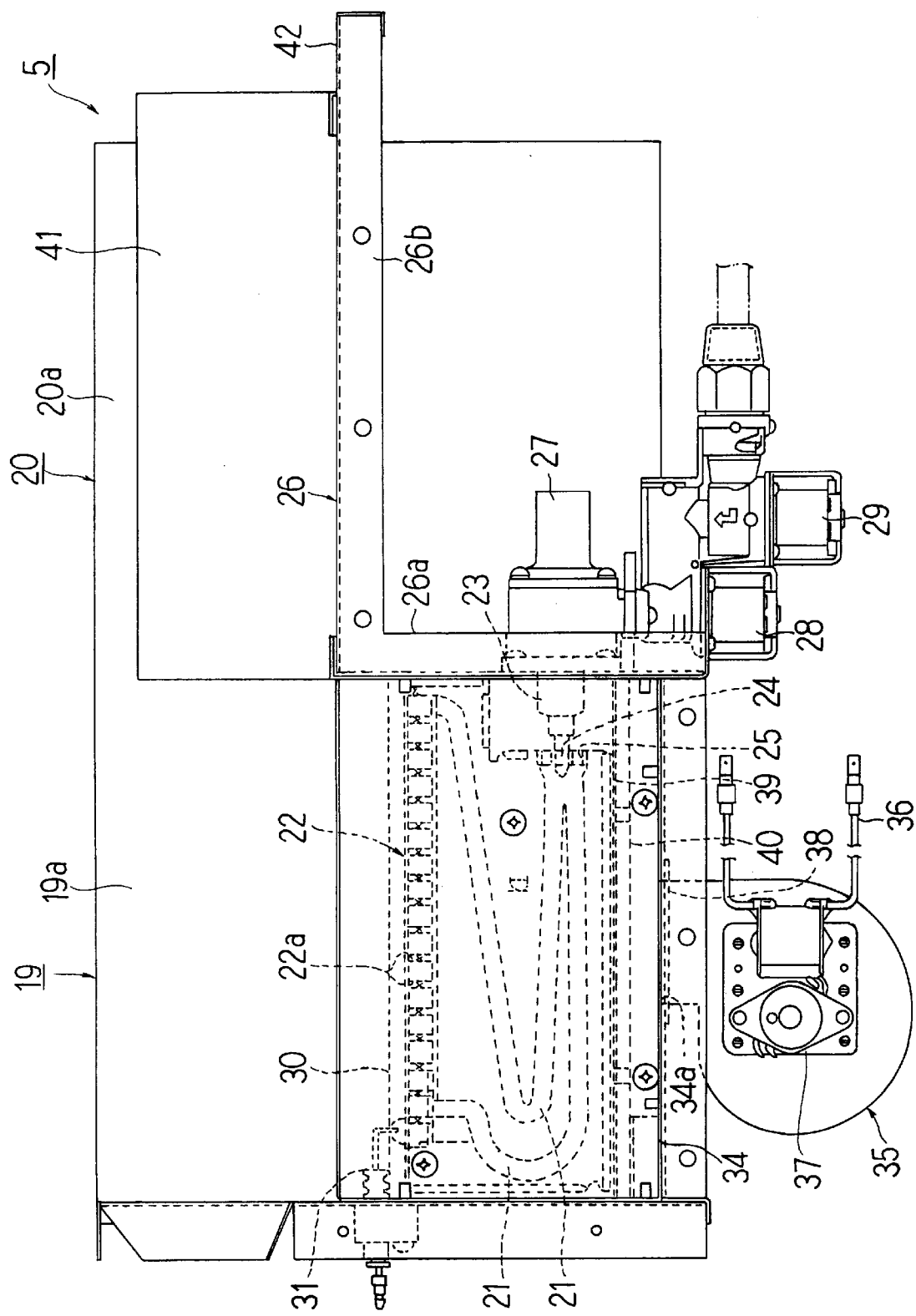
FIG. 6 is side elevational view of the burner unit.
Figure 7:
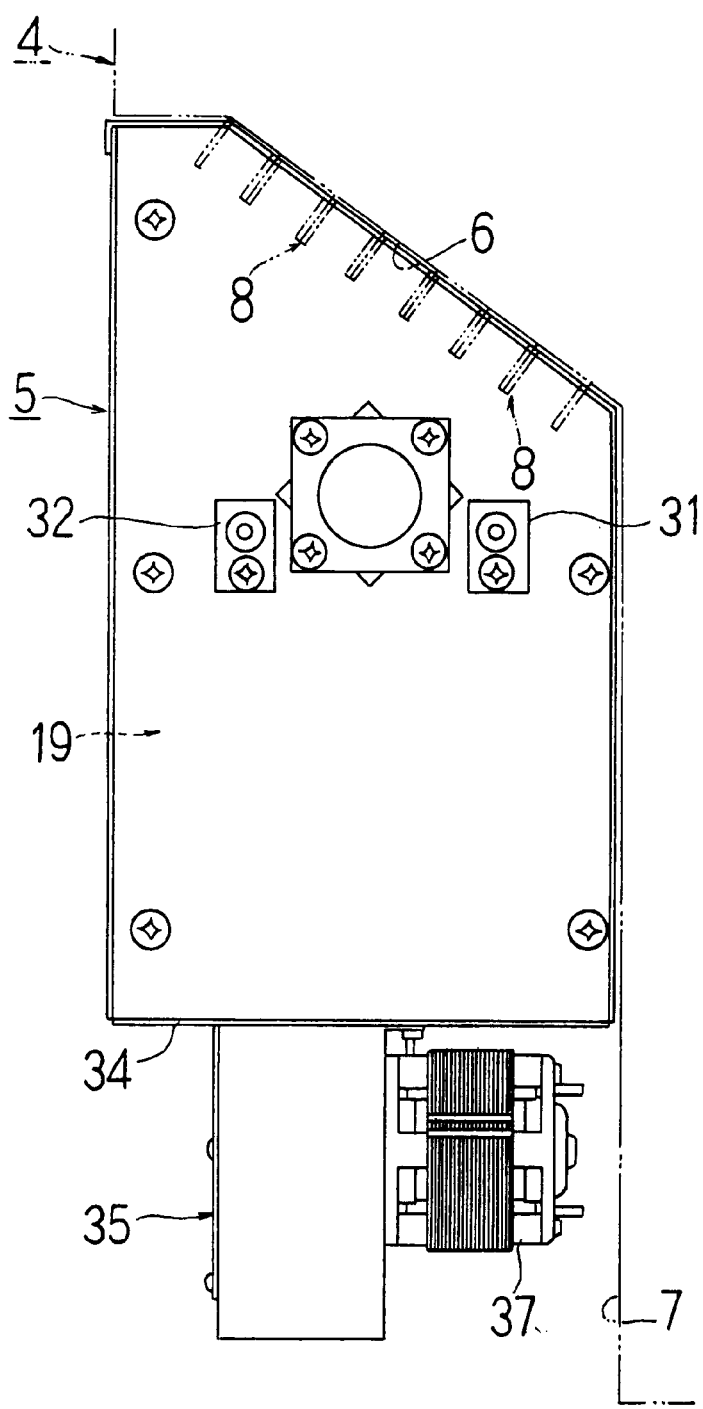
FIG. 7 is a view taken by the arrows A—A in FIG. 5.
Figure 8:
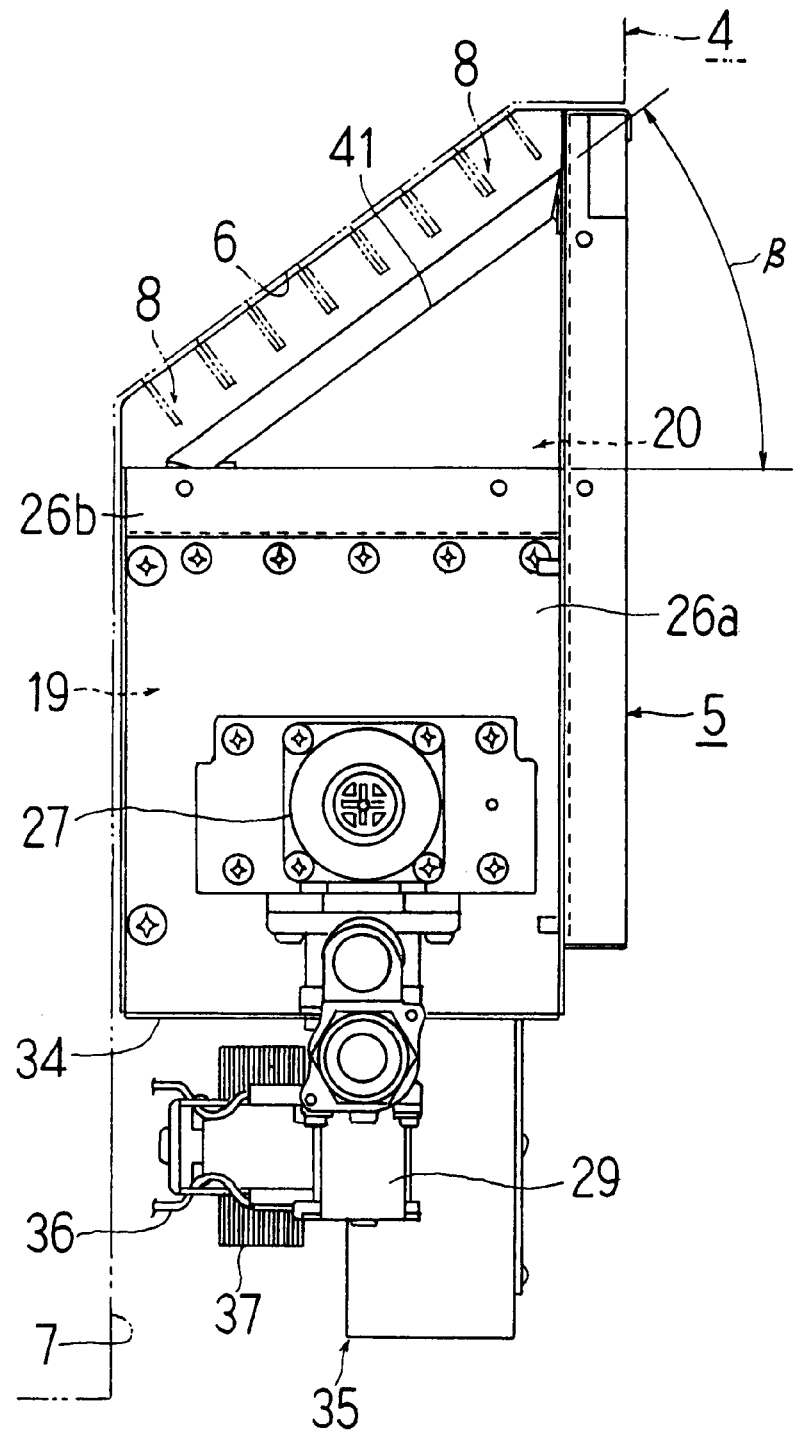
FIG. 8 is a view taken by the arrows B—B in FIG. 5.

Furthermore, although, in the above preferred embodiment, the fins 8 are formed to be channel-like in their cross section, and the respective side wall portions 8b are closely adhered to and fixed at the rear side of the inclination plane 6 of the liquid tank 4, for example, as shown in FIG. 10, the fins 8 having a channel-like cross section may be fixed thereat with an appointed interval. Still furthermore, as shown by an alternate long and double dashed line in FIG. 4, a groove 8c which prevents the fins 8 from being warped may be provided at the side wall portion 8b of the fins 8 along the lengthwise direction at an appointed interval, and as shown by an alternate long and triple dashed line in FIG. 4, the heights h1 and h2 of the side wall portion 8b of the fins 8 may be made different from each other along the lengthwise direction thereof.

Furthermore, in the abovementioned embodiment, although the liquid tank 4 is formed to be rectangular in its plan view, it may be made square, and as a controlling member to control the stream of secondary air from the fan 35, a bar-like member such as, for example, a round bar, square bar, etc., or plate member of a suitable thickness may be used in addition to the pipe 30. Furthermore, the shape of the liquid tank 4 in the abovementioned preferred embodiment, number and length of fins 8, number of rows of flame portions 22a of the burner 19 are all one example, and it is needless to say that they may be subjected to various modifications and variations without departing from the spirit of the invention.

What is claimed is:

1. A liquid heating apparatus, in which a burner unit is disposed downward of the bottom portion of a liquid tank formed to be a rectangular parallelepiped in its plan view, for raising the temperature of liquid in the liquid tank by heating the bottom portion of said liquid tank using a burner of said burner unit, said burner unit positioned such that it acts on a portion of said tank in a lengthwise direction, wherein a heating plane opposite flame ports of the burner and a low temperature portion located downward of said heating plane are formed at the bottom portion of said liquid tank, fins protruding toward the burner direction are juxtaposed and fixed on the rear side of the heating plane in the lengthwise direction thereof, and a fan capable of generating a flow of combustion gas among said fins is provided in said burner unit.

2. A liquid heating apparatus as set forth in claim 1, wherein said burner unit is provided, at one side in the lengthwise direction thereof, with a plurality of rows of flame ports disposed along the lengthwise direction of said fins and a burner having said fan, and is provided with an exhaust portion at the other side in the lengthwise direction thereof.

3. A liquid heating apparatus as set forth in claim 1, wherein said burner unit is provided with a control member, which controls a flow of secondary air, at a point position between the respective flames upward of a plurality of rows of flame ports of the burner.

4. A liquid heating apparatus as set forth in claim 2, wherein said burner unit is provided with a control member, which controls a flow of secondary air, at a point position between the respective flames upward of a plurality of rows of flame ports of the burner.

5. A liquid heating apparatus as set forth in claim 1 wherein the heating plane of said liquid tank is formed to be inclined.

6. A liquid heating apparatus as set forth in claim 2, wherein the heating plane of said liquid tank is formed to be inclined.

7. A liquid heating apparatus as set forth in claim 3, wherein the heating plane of said liquid tank is formed to be inclined.

* * * * *